United States Patent
Asanuma et al.

(10) Patent No.: US 12,503,225 B2
(45) Date of Patent: Dec. 23, 2025

(54) CONTROL DEVICE FOR AIRCRAFT

(71) Applicant: HONDA MOTOR CO., LTD., Tokyo (JP)

(72) Inventors: Masahiko Asanuma, Wako (JP); Susumu Mashio, Wako (JP); Yusuke Nakai, Wako (JP); Takahiro Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/473,822

(22) Filed: Sep. 25, 2023

(65) Prior Publication Data
US 2024/0109653 A1 Apr. 4, 2024

(30) Foreign Application Priority Data
Sep. 30, 2022 (JP) .................. 2022-158019

(51) Int. Cl.
*B64C 29/00* (2006.01)
*B64C 27/26* (2006.01)
*B64C 27/80* (2006.01)

(52) U.S. Cl.
CPC .............. *B64C 27/80* (2013.01); *B64C 27/26* (2013.01)

(58) Field of Classification Search
CPC .......... B64C 27/80; B64C 27/26; B64C 27/30
See application file for complete search history.

(56) References Cited

U.S. PATENT DOCUMENTS

| 6,293,491 | B1* | 9/2001 | Wobben ............... B64C 29/0025 244/17.23 |
|---|---|---|---|
| 11,708,157 | B2* | 7/2023 | Graves ................... B64C 9/00 244/6 |
| 2003/0094537 | A1 | 5/2003 | Austen-Brown |
| 2006/0266879 | A1 | 11/2006 | Svoboda, Jr. |
| 2013/0062455 | A1 | 3/2013 | Lugg et al. |
| 2018/0362154 | A1 | 12/2018 | Louis et al. |
| 2019/0127056 | A1* | 5/2019 | Weekes ................... B64C 39/12 |
| 2020/0079501 | A1 | 3/2020 | Graves et al. |
| 2020/0115045 | A1 | 4/2020 | Mermoz et al. |
| 2020/0391860 | A1 | 12/2020 | Foskey et al. |
| 2021/0011493 | A1 | 1/2021 | Simon |
| 2022/0306292 | A1 | 9/2022 | Ross et al. |
| 2024/0059393 | A1 | 2/2024 | Asanuma et al. |

FOREIGN PATENT DOCUMENTS

| JP | 2022-19033 A | 1/2022 |
|---|---|---|
| WO | 2022/130500 A1 | 6/2022 |

OTHER PUBLICATIONS

Japanese Office Action dated Sep. 24, 2025 issued in corresponding Japanese application No. 2022-158019; English machine translation included (8 pages).

* cited by examiner

*Primary Examiner* — Brian M O'Hara
(74) *Attorney, Agent, or Firm* — Rankin, Hill & Clark LLP (57) ABSTRACT

In a state where lift is generated in a front wing and a rear wing, a control device for an aircraft controls the pitch of each blade and the stopped state rotation angle of each VTOL rotor to control the force generated in each VTOL rotor in a state where rotation of the VTOL rotor is stopped, thereby applying a force to a fuselage.

7 Claims, 3 Drawing Sheets

CONTROL DEVICE FOR AIRCRAFT

CROSS-REFERENCE TO RELATED APPLICATIONS

This application is based upon and claims the benefit of priority from Japanese Patent Application No. 2022-158019 filed on Sep. 30, 2022, the contents of which are incorporated herein by reference.

BACKGROUND OF THE INVENTION

Field of the Invention

The present invention relates to a control device for an aircraft.

Description of the Related Art

US 2020/0079501 A1 discloses a control device for an aircraft. The aircraft includes rotors that generate lift by rotating, in addition to wings that generate lift. The control device optimizes the position of the rotor blades during cruising. This minimizes disturbance of airflow over the wings during cruising.

SUMMARY OF THE INVENTION

Better control is required when controlling the force acting on the fuselage by using the force generated in the rotors in a state where the rotation of the rotors is stopped.

An object of the present invention is to solve the above-mentioned problem.

According to an aspect of the present invention, there is provided a control device for an aircraft, the aircraft comprising: a plurality of rotors each including one or more blades and configured to generate lift by rotating about a rotation shaft; and at least one fixed wing configured to generate lift when a fuselage has an airspeed, wherein, in a state where the lift is generated in the fixed wing, the control device controls a pitch of each of the blades and a stopped state rotation angle of each of the rotors to control a force generated in each of the rotors in a state where rotation of the rotors is stopped, thereby applying a force to the fuselage.

According to the present invention, it is possible to provide better control when controlling the force acting on the fuselage by using the force generated in the rotors in a state where the rotation of the rotors is stopped.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

First Embodiment

[Configuration of Aircraft]

Figure 1:
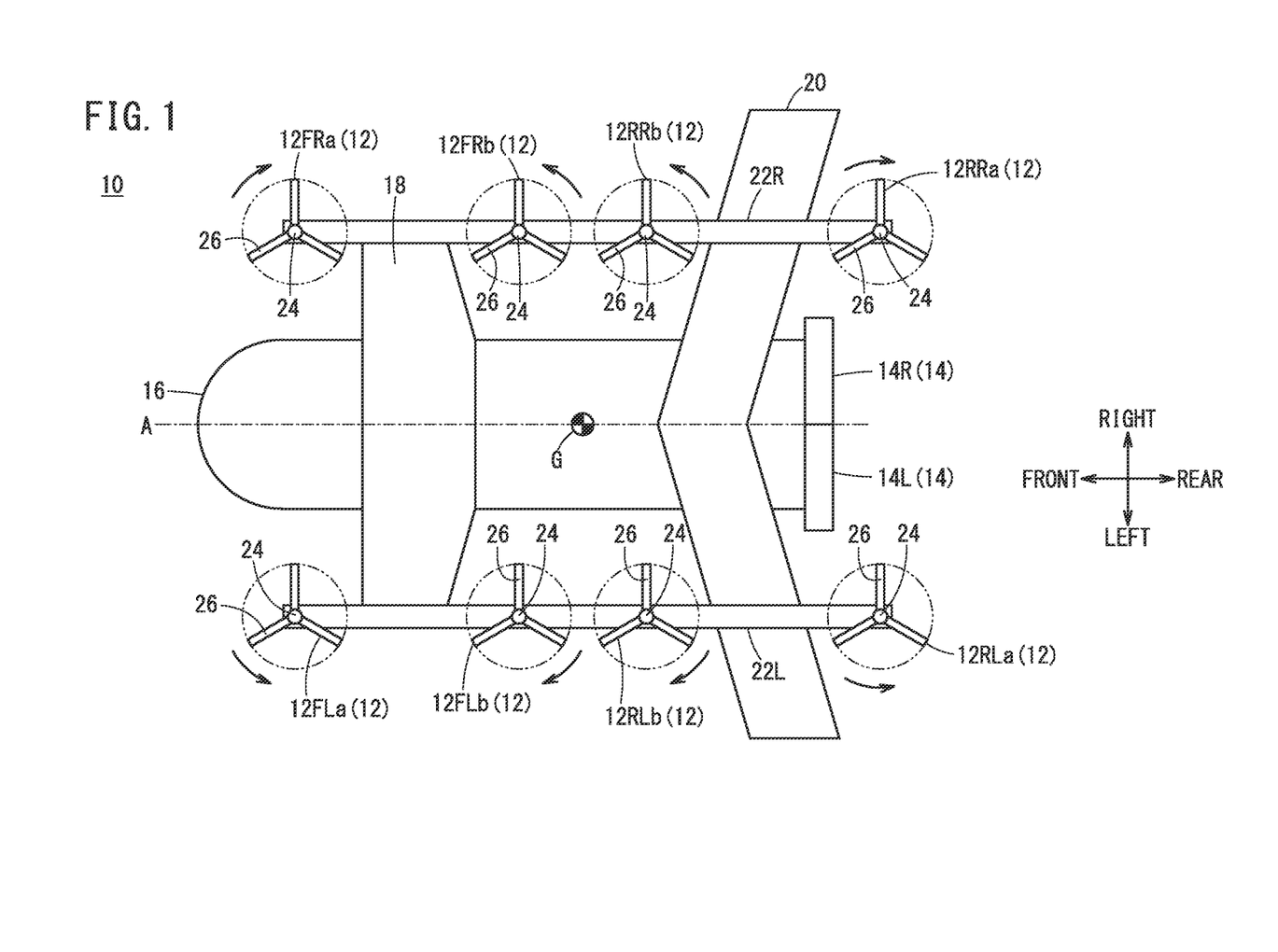
FIG. 1 is a schematic view of an aircraft.

FIG. 1 is a schematic view of an aircraft 10. The aircraft 10 of the present embodiment is an electric vertical take-off and landing aircraft (eVTOL aircraft). The aircraft 10 of the present embodiment includes a plurality of VTOL rotors 12 and a plurality of cruise rotors 14. Rotation of the VTOL rotors 12 generates lift for moving a fuselage 16 upward. Rotation of the cruise rotors 14 generates thrust for moving the fuselage 16 forward.

The aircraft 10 includes the fuselage 16. The fuselage 16 is provided with a cockpit, a cabin, and the like. A pilot rides in the cockpit and controls the aircraft 10. Passengers and the like ride in the cabin. The aircraft 10 may be automatically controlled without a pilot aboard.

The aircraft 10 includes a front wing 18 and a rear wing 20, which are fixed wings. The front wing 18 is provided forward of a center of gravity G of the fuselage 16. The rear wing 20 is provided rearward of the center of gravity G of the fuselage 16. In a case where the fuselage 16 has an airspeed, lift is generated in the front wing 18 and the rear wing 20 by controlling the angles of attack of the front wing 18 and the rear wing 20.

At least one of the front wing 18 or the rear wing 20 is provided with an aileron, an elevator, and a rudder (not shown). When the aileron is operated, a roll moment acts around the center of gravity G of the fuselage 16. When the elevator is operated, a pitch moment acts around the center of gravity G of the fuselage 16. When the rudder is operated, a yaw moment acts around the center of gravity G of the fuselage 16.

The aircraft 10 includes eight VTOL rotors 12. The eight VTOL rotors 12 are a rotor 12FLa, a rotor 12FLb, a rotor 12RLa, a rotor 12RLb, a rotor 12FRa, a rotor 12FRb, a rotor 12RRa, and a rotor 12RRb. Each of the VTOL rotors 12 corresponds to a rotor of the present invention.

The rotor 12FLa, the rotor 12FLb, the rotor 12RLa, and the rotor 12RLb are attached to a boom 22L. The boom 22L extends in the front-rear direction. The boom 22L is attached to the front wing 18 and the rear wing 20. The boom 22L is provided on the left side of the center of gravity G. That is, the rotor 12FLa, the rotor 12FLb, the rotor 12RLa, and the rotor 12RLb are disposed on the left side of the center of gravity G.

The rotor 12FLa is provided forward of the front wing 18. The rotor 12FLb is provided between the front wing 18 and the center of gravity G in the front-rear direction of the fuselage 16. The rotor 12RLb is provided between the center of gravity G and the rear wing 20 in the front-rear direction of the fuselage 16. The rotor 12RLa is provided rearward of the rear wing 20. The distance from the center of gravity G to the rotor 12FLb is shorter than the distance from the center of gravity G to the rotor 12FLa. The distance from the center of gravity G to the rotor 12RLb is shorter than the distance from the center of gravity G to the rotor 12RLa.

The rotor 12FLa corresponds to an outer rotor and a first rotor of the present invention. The rotor 12FLb corresponds to an inner rotor and a second rotor of the present invention. The rotor 12RLb corresponds to the inner rotor and a third rotor of the present invention. The rotor 12RLa corresponds to the outer rotor and a fourth rotor of the present invention.

The rotor 12FRa, the rotor 12FRb, the rotor 12RRa, and the rotor 12RRb are attached to a boom 22R. The boom 22R extends in the front-rear direction. The boom 22R is attached to the front wing 18 and the rear wing 20. The boom 22R is provided on the right side of the center of gravity G. That is, the rotor 12FRa, the rotor 12FRb, the rotor 12RRa, and the rotor 12RRb are disposed on the right side of the center of gravity G.

The rotor 12FRa is provided forward of the front wing 18. The rotor 12FRb is provided between the front wing 18 and the center of gravity G in the front-rear direction of the fuselage 16. The rotor 12RRb is provided between the center of gravity G and the rear wing 20 in the front-rear direction of the fuselage 16. The rotor 12RRa is provided rearward of the rear wing 20. The distance from the center of gravity G to the rotor 12FRb is shorter than the distance from the center of gravity G to the rotor 12FRa. The distance from the center of gravity G to the rotor 12RRb is shorter than the distance from the center of gravity G to the rotor 12RRa.

The rotor 12FRa corresponds to the outer rotor and the first rotor of the present invention. The rotor 12FRb corresponds to the inner rotor and the second rotor of the present invention. The rotor 12RRb corresponds to the inner rotor and the third rotor of the present invention. The rotor 12RRa corresponds to the outer rotor and the fourth rotor of the present invention.

In FIG. 1, the boom 22L and the boom 22R have a shape linearly extending in the front-rear direction of the fuselage 16. However, the boom 22L and the boom 22R may be formed in an arc shape protruding outward in the left-right direction of the fuselage 16. When the boom 22L is formed in an arc shape protruding outward in the left-right direction of the fuselage 16, the rotor 12FLb is located on the left side (outer side) of the rotor 12FLa in the left-right direction of the fuselage 16. When the boom 22R is formed in an arc shape protruding outward in the left-right direction of the fuselage 16, the rotor 12FRb is located on the right side (outer side) of the rotor 12FRa in the left-right direction of the fuselage 16.

Each of the VTOL rotors 12 includes a rotation shaft 24. The rotation shaft 24 extends in the up-down direction of the fuselage 16. The rotation shaft 24 may be angled (canted) a few degrees with respect to the up-down direction of the fuselage 16.

Each of the VTOL rotors 12 includes three blades 26. The number of the blades 26 of the VTOL rotor 12 is not limited to three. The number of the blades 26 of the VTOL rotor 12 may be one or more.

When the VTOL rotor 12 rotates about the rotation shaft 24, lift is generated in the blades 26. The magnitude of the lift generated in the VTOL rotor 12 is controlled by controlling the rotational speed of the VTOL rotor 12 and the pitch of the blades 26. The VTOL rotor 12 rotates and generates lift mainly during vertical take-off, during transition from vertical take-off to cruising, during transition from cruising to vertical landing, during vertical landing, during hovering, and the like.

In a state where the aircraft 10 is viewed from above, the rotor 12FLa, the rotor 12RLa, the rotor 12FRb, and the rotor 12RRb rotate counterclockwise. In a state where the aircraft 10 is viewed from above, the rotor 12FRa, the rotor 12RRa, the rotor 12FLb, and the rotor 12RLb rotate clockwise. Note that the rotation direction of each VTOL rotor 12 is not limited to the above-described direction.

In a case where the fuselage 16 has an airspeed, lift is generated in each VTOL rotor 12 even in a state where the rotation of the VTOL rotor 12 is stopped. The magnitude of the lift generated in the VTOL rotor 12 is controlled by controlling the stopped state rotation angle of the VTOL rotor 12 and the pitch of the blades 26. The magnitude of drag generated in the VTOL rotor 12 is controlled by controlling the stopped state rotation angle of the VTOL rotor 12 and the pitch of the blades 26. For example, at the time of cruising, the magnitudes of the lift and the drag generated in the VTOL rotor 12 are controlled in a state where the rotation of the VTOL rotor 12 is stopped. Not only at the time of cruising, but also at the time of transition from vertical take-off to cruising, at the time of transition from cruising to vertical landing, or the like, the magnitudes of the lift and the drag generated in the VTOL rotor 12 may be controlled in a state where the rotation of the VTOL rotor 12 is stopped. Further, in a case where the fuselage 16 has an airspeed and lift is generated in the front wing 18 and the rear wing 20, the magnitudes of the lift and the drag generated in the VTOL rotor 12 may be controlled in a state where the rotation of the VTOL rotor 12 is stopped.

The magnitudes of the lift and the drag generated in each of the eight VTOL rotors 12 are controlled to cause a roll moment, a pitch moment, and a yaw moment to act around the center of gravity G of the fuselage 16.

The roll moment acts around the center of gravity G of the fuselage 16 by causing a difference between the total lift of the four VTOL rotors 12 disposed on the left side of the center of gravity G, and the total lift of the four VTOL rotors 12 disposed on the right side of the center of gravity G.

The four VTOL rotors 12 disposed on the left side of the center of gravity G indicate the rotor 12FLa, the rotor 12FLb, the rotor 12RLa, and the rotor 12RLb. The four VTOL rotors 12 disposed on the right side of the center of gravity G indicate the rotor 12FRa, the rotor 12FRb, the rotor 12RRa, and the rotor 12RRb.

The pitch moment acts around the center of gravity G of the fuselage 16 by causing a difference between the total lift of the four VTOL rotors 12 disposed forward of the center of gravity G, and the total lift of the four VTOL rotors 12 disposed rearward of the center of gravity G.

The four VTOL rotors 12 disposed forward of the center of gravity G indicate the rotor 12FLa, the rotor 12FLb, the rotor 12FRa, and the rotor 12FRb. The four VTOL rotors 12 disposed rearward of the center of gravity G indicate the rotor 12RLa, the rotor 12RLb, the rotor 12RRa, and the rotor 12RRb.

The yaw moment acts around the center of gravity G of the fuselage 16 by causing a difference between the total drag of the four VTOL rotors 12 disposed on the left side of the center of gravity G, and the total drag of the four VTOL rotors 12 disposed on the right side of the center of gravity G.

The aircraft 10 includes two cruise rotors 14. The two cruise rotors 14 are a rotor 14L and a rotor 14R.

The rotor 14L and the rotor 14R are attached to a rear portion of the fuselage 16. The rotor 14L is disposed on the left side of a center line A of the fuselage 16. The rotor 14R is disposed on the right side of the center line A of the fuselage 16.

A rotation shaft (not shown) of each cruise rotor 14 extends in the front-rear direction of the fuselage 16. The rotation shaft of each cruise rotor 14 may be angled (canted) a few degrees with respect to the front-rear direction. Each cruise rotor 14 includes one or more blades (not shown).

When the cruise rotor 14 rotates about the rotation shaft, thrust is generated in the blades. The magnitude of the thrust of the cruise rotor 14 is controlled by controlling the rotational speed thereof and the pitch of the blades. The cruise rotor 14 rotates and generates thrust mainly during transition from vertical take-off to cruising, during cruising, during transition from cruising to vertical landing, and the like.

[Configuration of Power Supply System]

Figure 2:
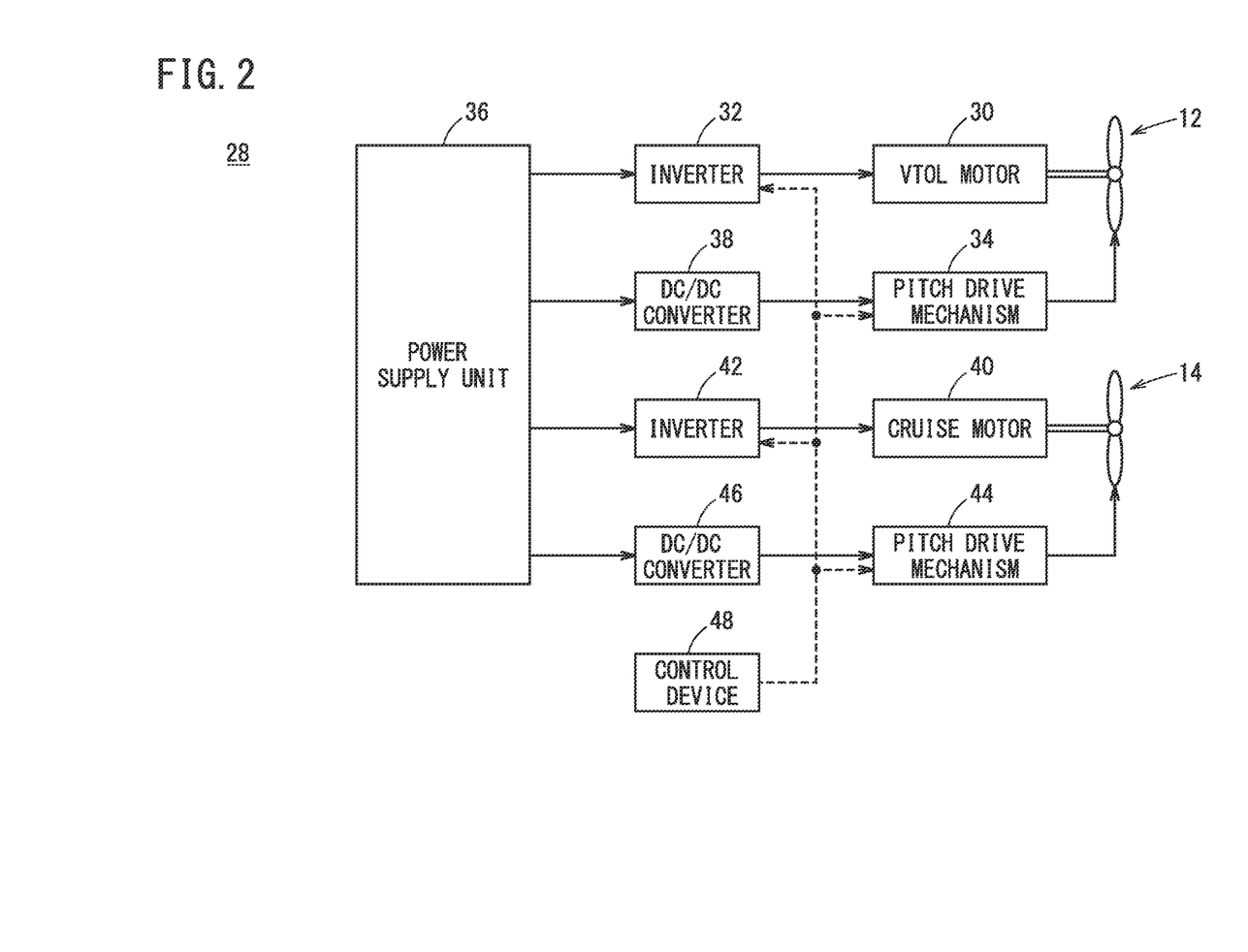
FIG. 2 is a diagram showing a configuration of a power supply system.

FIG. 2 is a diagram showing a configuration of a power supply system 28.

A VTOL motor 30, an inverter 32, and a pitch drive mechanism 34 are provided as drive mechanisms for each of the VTOL rotors 12.

The VTOL motor 30 is PWM-controlled by the inverter 32. As a result, the rotational speed of the VTOL rotor 12 is controlled. The pitch drive mechanism 34 changes the pitch of the blades 26 of the VTOL rotor 12.

Further, by PWM-controlling the VTOL motor 30, a stopped state rotation angle of the VTOL rotor 12 is controlled. The VTOL rotor 12 maintains a predetermined rotation angle in a state where the rotation thereof is stopped. The stopped state rotation angle indicates the predetermined rotation angle that is thus maintained. In order to maintain the state where the VTOL rotor 12 is stopped at the stopped state rotation angle, the inverter 32 controls the VTOL motor 30 to output torque that balances the external force.

Electric power at a relatively high voltage of several hundreds of volts output from a power supply unit 36 is supplied to the VTOL motor 30. Electric power output from the power supply unit 36 is stepped down to a relatively low voltage of several tens of volts by a DC/DC converter 38, and the low voltage electric power is supplied to the pitch drive mechanism 34.

A cruise motor 40, an inverter 42, and a pitch drive mechanism 44 are provided as drive mechanisms for each of the cruise rotors 14.

The cruise motor 40 is PWM-controlled by the inverter 42. As a result, the rotational speed of the cruise rotor 14 is controlled. The pitch drive mechanism 44 changes the pitch of the blades of the cruise rotor 14.

Electric power at a relatively high voltage of several hundreds of volts output from the power supply unit 36 is supplied to the cruise motor 40. Electric power output from the power supply unit 36 is stepped down to a relatively low voltage of several tens of volts by a DC/DC converter 46, and the low voltage electric power is supplied to the pitch drive mechanism 44.

The power supply unit 36 includes an engine, a generator, a power control unit, a battery, and the like, which are not illustrated. The generator is driven by the engine and generates electric power. The power control unit converts the AC power generated by the generator into DC power, and outputs the DC power. The battery stores a part of electric power output from the power control unit. The battery outputs electric power when electric power generated by the generator is insufficient with respect to electric power consumed by the VTOL motor 30, the cruise motor 40, and the like.

The power supply unit 36 may include the engine, the generator, and the power control unit, and may not include the battery. The power supply unit 36 may include the battery, and may not include the engine, the generator, and the power control unit.

The inverter 32, the pitch drive mechanism 34, the inverter 42, and the pitch drive mechanism 44 are controlled by a control device 48.

[Configuration of Control Device]

Figure 3:
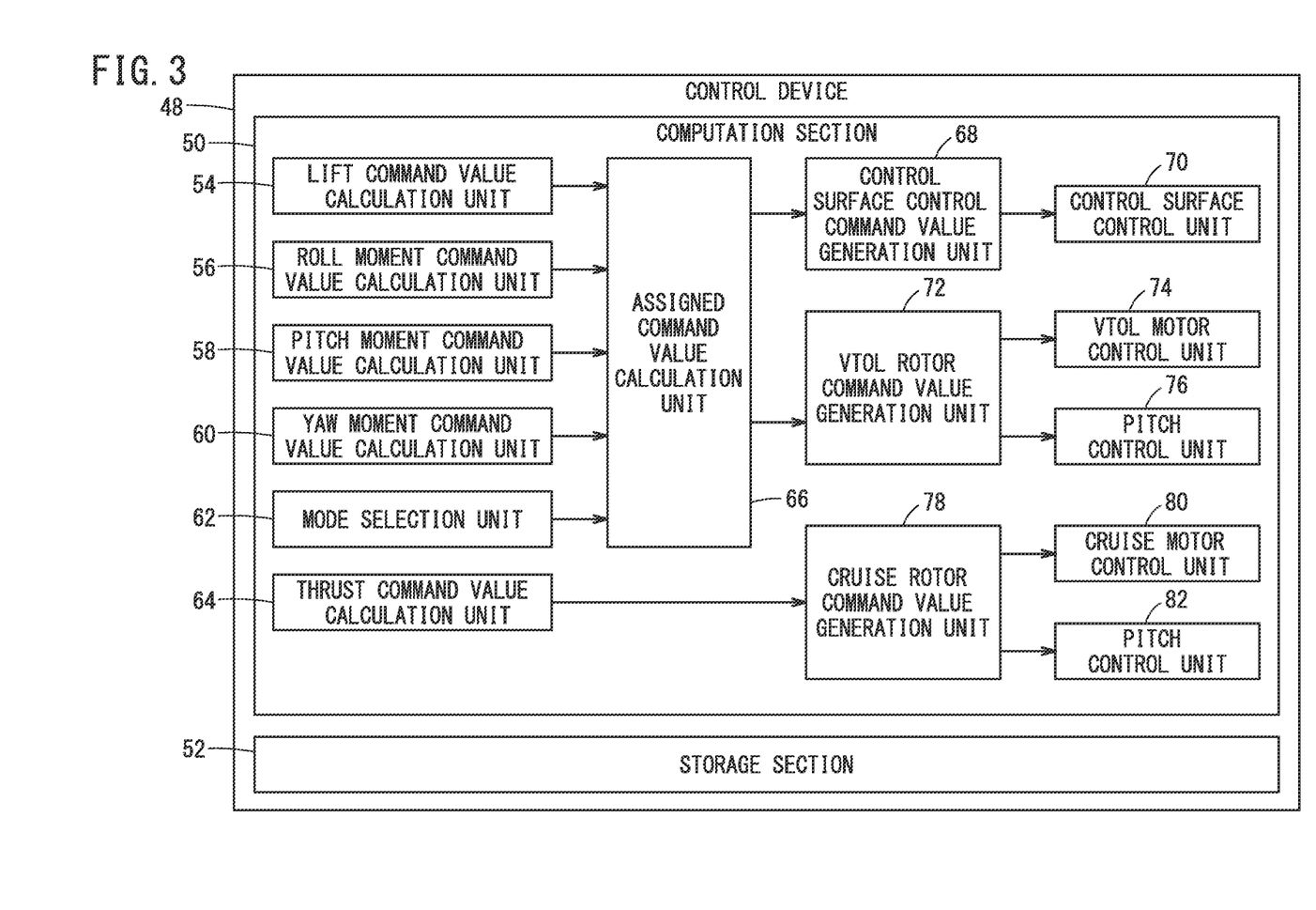
FIG. 3 is a block diagram of a control device.

FIG. 3 is a block diagram of the control device 48. The control device 48 includes a computation section 50 and a storage section 52.

The computation section 50 is, for example, a processor such as a central processing unit (CPU) or a graphics processing unit (GPU). The computation section 50 includes a lift command value calculation unit 54, a roll moment command value calculation unit 56, a pitch moment command value calculation unit 58, a yaw moment command value calculation unit 60, a mode selection unit 62, a thrust command value calculation unit 64, an assigned command value calculation unit 66, a control surface control command value generation unit 68, a control surface control unit 70, a VTOL rotor command value generation unit 72, a VTOL motor control unit 74, a pitch control unit 76, a cruise rotor command value generation unit 78, a cruise motor control unit 80, and a pitch control unit 82.

The lift command value calculation unit 54, the roll moment command value calculation unit 56, the pitch moment command value calculation unit 58, the yaw moment command value calculation unit 60, the mode selection unit 62, the thrust command value calculation unit 64, the assigned command value calculation unit 66, the control surface control command value generation unit 68, the control surface control unit 70, the VTOL rotor command value generation unit 72, the VTOL motor control unit 74, the pitch control unit 76, the cruise rotor command value generation unit 78, the cruise motor control unit 80, and the pitch control unit 82 are realized by the computation section 50 executing programs stored in the storage section 52.

At least some of the lift command value calculation unit 54, the roll moment command value calculation unit 56, the pitch moment command value calculation unit 58, the yaw moment command value calculation unit 60, the mode selection unit 62, the thrust command value calculation unit 64, the assigned command value calculation unit 66, the control surface control command value generation unit 68, the control surface control unit 70, the VTOL rotor command value generation unit 72, the VTOL motor control unit 74, the pitch control unit 76, the cruise rotor command value generation unit 78, the cruise motor control unit 80, and the pitch control unit 82 may be realized by an integrated circuit such as an application specific integrated circuit (ASIC) or a field-programmable gate array (FPGA).

At least some of the lift command value calculation unit 54, the roll moment command value calculation unit 56, the pitch moment command value calculation unit 58, the yaw moment command value calculation unit 60, the mode selection unit 62, the thrust command value calculation unit 64, the assigned command value calculation unit 66, the control surface control command value generation unit 68, the control surface control unit 70, the VTOL rotor command value generation unit 72, the VTOL motor control unit 74, the pitch control unit 76, the cruise rotor command value generation unit 78, the cruise motor control unit 80, and the pitch control unit 82 may be realized by an electronic circuit including a discrete device.

The storage section 52 is constituted by a volatile memory (not shown) and a non-volatile memory (not shown) which are computer-readable storage media. The volatile memory is, for example, a random access memory (RAM) or the like. The non-volatile memory is, for example, a read only memory (ROM), a flash memory, or the like. Data and the like are stored in, for example, the volatile memory. Programs, tables, maps, and the like are stored in, for example, the non-volatile memory. At least a part of the storage section 52 may be included in the processor, the integrated circuit, or the like described above.

The lift command value calculation unit 54 calculates a lift command value. The lift command value is determined in accordance with, for example, an operation amount of an operation input unit by the pilot. The operation input unit is, for example, a control stick, a pedal, a lever, or the like. The operation amount of the operation input unit and the lift command value may not have a one-to-one correspondence. The lift command value with respect to the operation amount of the operation input unit may differ depending on the operation range of the operation input unit, the operation speed of the operation input unit, the altitude of the fuselage 16, and the like. The altitude of the fuselage 16 is estimated based on, for example, a distance between the fuselage 16 and the ground detected by a ground distance meter (not shown). The altitude of the fuselage 16 is estimated based on, for example, signals received from a global navigation satellite system (GNSS).

When there is no operation input to the operation input unit by the pilot, the lift command value may be automatically determined and hovering may be performed regardless of the operation amount of the operation input unit. Further, when the aircraft 10 is automatically controlled, the lift command value may be automatically determined in accordance with a preset flight path, regardless of the operation amount of the operation input unit.

The roll moment command value calculation unit 56 calculates a roll moment command value. The roll moment command value is determined in accordance with the operation amount of the operation input unit by the pilot. The operation amount of the operation input unit and the roll moment command value may not have a one-to-one correspondence. The roll moment command value with respect to the operation amount of the operation input unit may differ depending on the operation range of the operation input unit, the operation speed of the operation input unit, the altitude of the fuselage 16, and the like. The angular velocity of the fuselage 16 is detected by, for example, a gyro sensor (not shown).

When there is no operation input to the operation input unit by the pilot, the roll moment command value may be automatically determined and hovering may be performed regardless of the operation amount of the operation input unit. Further, when the aircraft 10 is automatically controlled, the roll moment command value may be automatically determined in accordance with the preset flight path, regardless of the operation amount of the operation input unit.

The pitch moment command value calculation unit 58 calculates a pitch moment command value. The pitch moment command value is determined in accordance with, for example, the operation amount of the operation input unit by the pilot. The operation amount of the operation input unit and the pitch moment command value may not have a one-to-one correspondence. The pitch moment command value with respect to the operation amount of the operation input unit may differ depending on the operation range of the operation input unit, the operation speed of the operation input unit, the altitude of the fuselage 16, and the like.

When there is no operation input to the operation input unit by the pilot, the pitch moment command value may be automatically determined and hovering may be performed regardless of the operation amount of the operation input unit. Further, when the aircraft 10 is automatically controlled, the pitch moment command value may be automatically determined in accordance with the preset flight path, regardless of the operation amount of the operation input unit.

The yaw moment command value calculation unit 60 calculates a yaw moment command value. The yaw moment command value is determined in accordance with, for example, the operation amount of the operation input unit by the pilot. The operation amount of the operation input unit and the yaw moment command value may not have a one-to-one correspondence. The yaw moment command value with respect to the operation amount of the operation input unit may differ depending on the operation range of the operation input unit, the operation speed of the operation input unit, the altitude of the fuselage 16, and the like.

When there is no operation input to the operation input unit by the pilot, the yaw moment command value may be automatically determined and hovering may be performed regardless of the operation amount of the operation input unit. Further, when the aircraft 10 is automatically controlled, the yaw moment command value may be automatically determined in accordance with the preset flight path, regardless of the operation amount of the operation input unit.

The mode selection unit 62 selects a normal mode or an energy saving mode. The normal mode or the energy saving mode may be selected based on, for example, an operation of a switch (not shown) by the pilot. The normal mode or the energy saving mode may be automatically selected based on, for example, the remaining amount of fuel or the like.

In a case where the normal mode is selected, for example, during cruising, the magnitudes of the lift and the moment acting on the fuselage 16 are controlled by controlling the stopped state rotation angle of the VTOL rotor 12 and the pitch of the blades 26. In a case where the energy saving mode is selected, for example, during cruising, the magnitude of the drag acting on the fuselage 16 is controlled to be smaller than in a case where the normal mode is selected, by controlling the stopped state rotation angle of the VTOL rotor 12 and the pitch of the blades 26. Even in a case where the magnitudes of the lift and the moment acting on the fuselage 16 are controlled by controlling the stopped state rotation angle of the VTOL rotor 12 and the pitch of the blades 26, the lift and the moment acting on the fuselage 16 may be controlled by controlling the control surfaces of the front wing 18 and the rear wing 20.

The thrust command value calculation unit 64 calculates a thrust command value. The thrust command value is determined in accordance with, for example, the operation amount of the operation input unit by the pilot. The operation amount of the operation input unit and the thrust command value may not have a one-to-one correspondence. The thrust command value with respect to the operation amount of the operation input unit may differ depending on the operation range of the operation input unit, the operation speed of the operation input unit, the altitude of the fuselage 16, and the like. The airspeed of the fuselage 16 is detected by, for example, an airspeed sensor (not shown)

When there is no operation input to the operation input unit by the pilot, the thrust command value may be automatically determined and the aircraft 10 may fly at a constant speed. Further, when the aircraft 10 is automatically controlled, the thrust command value may be automatically determined in accordance with the preset flight path, regardless of the operation amount of the operation input unit.

The assigned command value calculation unit 66 calculates an assigned command value for each of the lift command value, the roll moment command value, the pitch moment command value, and the yaw moment command value. The assigned command value indicates, for each of the command values, a command value assigned to the control of the control surfaces of the front wing 18 and the rear wing 20, and a command value assigned to the control of each VTOL rotor 12. The assigned command value may be calculated in accordance with a mode selected from the normal mode and the energy saving mode. The assigned command value may be calculated in accordance with the magnitude of each of the command values.

The control surface control command value generation unit 68 generates drive command values for the aileron, the elevator, and the rudder based on the assigned command values assigned to the control of the control surfaces of the front wing 18 and the rear wing 20. Based on the drive command values, the control surface control unit 70 controls drive mechanisms respectively driving the aileron, the elevator, and the rudder.

In a case where the normal mode is selected by the mode selection unit 62, the VTOL rotor command value generation unit 72 generates a drive command value for the VTOL motor 30 based on the assigned command value assigned to the control of each VTOL rotor 12. The VTOL rotor command value generation unit 72 generates a drive command value for the blades 26 of the VTOL rotor 12 based on the assigned command value assigned to the control of each VTOL rotor 12.

In a case where the energy saving mode is selected by the mode selection unit 62, the VTOL rotor command value generation unit 72 sets a rotation stop position of the VTOL motor 30 and the pitch of the blades 26 such that the drag generated in the VTOL rotor 12 is smaller than that in a case where the normal mode is selected. The VTOL rotor command value generation unit 72 generates the drive command value for the VTOL motor 30 and a drive command value for the pitch drive mechanism 34 based on the rotation stop position of the VTOL motor 30 and the pitch of the blade 26 that have been set. The VTOL rotor command value generation unit 72 may set the rotation stop position of the VTOL motor 30 and the pitch of the blades 26 such that the drag generated in the VTOL rotor 12 is minimized.

The VTOL motor control unit 74 controls the inverter 32 based on the drive command for the VTOL motor 30. The pitch control unit 76 controls the pitch drive mechanism 34 based on the drive command value for the blades 26 of the VTOL rotor 12.

The cruise rotor command value generation unit 78 generates a drive command value for the cruise motor 40 based on the thrust command value. The cruise rotor command value generation unit 78 generates a drive command value for the blades of the cruise rotor 14 based on the thrust command value. The cruise motor control unit 80 controls the inverter 42 based on the drive command for the cruise motor 40. The pitch control unit 82 controls the pitch drive mechanism 44 based on the drive command value for the blades of the cruise rotor 14.

In the above description, the thrust command value calculated by the thrust command value calculation unit 64 is directly input to the cruise rotor command value generation unit 78. The cruise rotor command value generation unit 78 generates the drive command value for the cruise motor 40 based on the thrust command value.

The thrust command value may also be input to the assigned command value calculation unit 66 in the same manner as the lift command value, the roll moment command value, the pitch moment command value, and the yaw moment command value. In this case, the assigned command value calculation unit 66 calculates the assigned command value for each of the lift command value, the roll moment command value, the pitch moment command value, the yaw moment command value, and the thrust command value. The cruise rotor command value generation unit 78 may generate the drive command value for the cruise motor 40 based on the command value assigned to each cruise rotor 14.

[Force Generated in VTOL Rotor when Rotation Thereof is Stopped]

As described above, in the aircraft 10 of the present embodiment, the stopped state rotation angle of each VTOL rotor 12 and the pitch of the blades 26 are controlled in a state where the rotation of the VTOL rotor 12 is stopped. This controls the magnitude of the lift generated in each VTOL rotor 12. As a result, the magnitude of the lift acting on the fuselage 16 and the magnitude of the moment acting around the center of gravity G of the fuselage 16 are controlled.

When applying a moment around the center of gravity G of the fuselage 16, the control device 48 makes the moment generated by the force in the outer rotors provided at positions far from the center of gravity G larger than the moment generated by the force in the inner rotors provided at positions close to the center of gravity G. In a case where the force generated in the outer rotors and the force generated in the inner rotors are the same, the moment acting around the center of gravity G of the fuselage 16 due to the force generated in the outer rotors is larger than the moment acting around the center of gravity G of the fuselage 16 due to the force generated in the inner rotors. Therefore, the control device 48 can ensure the moment acting around the center of gravity G of the fuselage 16 while suppressing the force generated in the outer rotors and the inner rotors.

When applying a roll moment around the center of gravity G of the fuselage 16, the control device 48 produces a difference between the total lift of the four VTOL rotors 12 disposed on the left side of the center of gravity G, and the total lift of the four VTOL rotors 12 disposed on the right side of the center of gravity G. In this case, the control device 48 makes the magnitude of the roll moment acting around the center of gravity G of the fuselage 16 due to the lift generated in the outer rotors larger than the magnitude of the roll moment acting around the center of gravity G of the fuselage 16 due to the lift generated in the inner rotors. At this time, the control device 48 may make the total magnitude of the lifts generated in the outer rotors larger than the total magnitude of the lifts generated in the inner rotors.

When applying a pitch moment around the center of gravity G of the fuselage 16, the control device 48 produces a difference between the total lift of the four VTOL rotors 12 disposed forward of the center of gravity G, and the total lift of the four VTOL rotors 12 disposed rearward of the center of gravity G. In this case, the control device 48 makes the magnitude of the pitch moment acting around the center of gravity G of the fuselage 16 due to the lift generated in the outer rotors larger than the magnitude of the pitch moment acting around the center of gravity G of the fuselage 16 due to the lift generated in the inner rotors. At this time, the control device 48 may make the total magnitude of the lifts generated in the outer rotors larger than the total magnitude of the lifts generated in the inner rotors.

When applying a yaw moment around the center of gravity G of the fuselage 16, the control device 48 produces a difference between the total drag of the four VTOL rotors 12 disposed on the left side of the center of gravity G, and the total drag of the four VTOL rotors 12 disposed on the right side of the center of gravity G. In this case, the control device 48 makes the magnitude of the yaw moment acting around the center of gravity G of the fuselage 16 due to the drag generated in the outer rotors larger than the magnitude of the yaw moment acting around the center of gravity G of the fuselage 16 due to the drag generated in the inner rotors. At this time, the control device 48 may make the total magnitude of the lifts generated in the outer rotors larger than the total magnitude of the lifts generated in the inner rotors.

[VTOL Rotor Stopped State Rotation Angle Control and Blade Pitch Control]

The lift and the drag generated in each VTOL rotor 12 in a state where the rotation of the VTOL rotor 12 is stopped are controlled by the rotation stop position of the VTOL rotor 12 and the pitch of the blades 26.

When the lift and the drag generated in each VTOL rotor 12 are changed toward the command values, the control device 48 controls the pitch of the blades 26 to change the lift and the drag, and then controls the rotation stop position of the VTOL rotor 12 to change the lift and the drag.

The rotation stop position of the VTOL rotor 12 is maintained by the inverter 32 controlling the VTOL motor 30 to cause the VTOL motor 30 to output torque that balances the external force. When the rotation stop position of the VTOL rotor 12 is changed, it is necessary to cancel the balance between the external force and the torque of the VTOL motor 30. The response speed is faster when the pitch of the blade 26 is changed than when the balance between the external force and the torque of the VTOL motor 30 is canceled. Thus, the response speed of changes of the lift and the drag generated in each VTOL rotor 12 is improved.

Advantageous Effects

In the aircraft 10 of the present embodiment, in a case where the fuselage 16 has an airspeed, lift and drag can be generated in each VTOL rotor 12 in a state where the rotation of the VTOL rotor 12 is stopped.

Further, in the aircraft 10 of the present embodiment, the control device 48 controls the stopped state rotation angle of the VTOL rotor 12 and the pitch of the blades 26 to control the force generated in each VTOL rotor 12 in a state where the rotation of the VTOL rotor 12 is stopped, thereby applying a force to the fuselage 16. Accordingly, even in a state where the rotation of the VTOL rotors 12 is stopped, a force can be applied to the fuselage 16 due to the force generated in each of the VTOL rotors 12.

Further, in the aircraft 10 of the present embodiment, in a case where a moment is generated around the center of gravity G of the fuselage 16, the control device 48 makes the moment acting around the center of gravity G of the fuselage 16 due to the force generated in the outer rotors larger than the moment acting around the center of gravity G of the fuselage 16 due to the force generated in the inner rotors. As a result, the control device 48 can ensure the moment acting around the center of gravity G of the fuselage 16 while suppressing the force generated in the outer rotors and the inner rotors.

Further, in the aircraft 10 of the present embodiment, the control device 48 controls the pitch of the blades 26 to change the lift and the drag, and then controls the rotation stop position of the VTOL rotor 12 to change the lift and the drag. As a result, the control device 48 can improve the response speed when changing the lift and the drag generated in each of the VTOL rotors 12.

Furthermore, in the aircraft 10 of the present embodiment, in a case where the energy saving mode in which reduction of the drag acting on the fuselage 16 is prioritized is selected, the control device 48 controls the stopped state rotation angle of each VTOL rotor 12 and the pitch of the blades 26 to reduce the drag generated in each VTOL rotor 12 as compared with a case where the other mode is selected. Accordingly, the aircraft 10 can reduce energy consumption.
[Modification]

The VTOL rotors 12 of the aircraft 10 of the first embodiment rotate to generate lift for moving the fuselage 16 upward. Instead of the VTOL rotor 12, a tilt rotor capable of changing its orientation with respect to the fuselage 16 may be employed. When the tilt rotor is oriented at a predetermined angle with respect to the fuselage 16, the tilt rotor rotates to generate lift for moving the fuselage 16 upward.

In the aircraft 10 of the first embodiment, a plurality of (four in the first embodiment) VTOL rotors 12 are arranged in the front-rear direction of the fuselage 16. Instead, the plurality of VTOL rotors 12 of the aircraft 10 may be arranged in the left-right direction of the fuselage 16. Alternatively, the plurality of VTOL rotors 12 of the aircraft 10 may be arranged in the up-down direction of the fuselage 16.

In the first embodiment, the VTOL rotor 12 is connected to the VTOL motor 30. In this regard, a gear box may be provided between the VTOL motor 30 and the VTOL rotor 12. The gear box is a transmission that transmits the rotation of the VTOL motor 30 to the VTOL rotor 12 at a changed speed. Similarly, a gearbox may be provided between the cruise motor 40 and the cruise rotor 14.

Invention Obtained from Embodiment

The invention that can be grasped from the above embodiment will be described below.

Provided is the control device (48) for the aircraft (10), the aircraft including: the plurality of rotors (12) each including one or more blades (26) and configured to generate lift by rotating about the rotation shaft (24); and at least one fixed wing (18, 20) configured to generate lift when the fuselage (16) has an airspeed, wherein, in a state where the lift is generated in the fixed wing, the control device controls the pitch of each of the blades and the stopped state rotation angle of each of the rotors to control the force generated in each of the rotors in a state where the rotation of the rotors is stopped, thereby applying a force to the fuselage. According to this feature, even in a state where the rotation of the rotors is stopped, a force can be applied to the fuselage due to the force generated in each of the rotors.

In the control device for the aircraft, the aircraft may include one or more inner rotors (12FLb, 12RLb, 12FRb, 12RRb) serving as the rotors, and one or more outer rotors (12FLa, 12RLa, 12FRa, 12RRa) serving as the rotors, the distance from the center of gravity (G) of the fuselage to each of the inner rotors may be shorter than the distance from the center of gravity to each of the outer rotors, and when generating a moment around the center of gravity of the fuselage, the control device may make the moment applied to the fuselage due to the force generated in each of the outer rotors larger than the moment applied to the fuselage due to the force generated in each of the inner rotors. According to this feature, the control device can reduce the force generated in the rotors relative to the required moment magnitude.

In the control device for the aircraft, the aircraft may include the front wing (18) which is the fixed wing and is provided forward of the center of gravity of the fuselage, the rear wing (20) which is the fixed wing and is provided rearward of the center of gravity of the fuselage, one or more first rotors (12FLa, 12FRa) which are the outer rotors and are provided forward of the front wing, one or more second rotors (12FLb, 12FRb) which are the inner rotors and are provided between the front wing and the center of gravity in the front-rear direction of the fuselage, one or more third rotors (12RLb, 12RRb) which are the inner rotors and are provided between the center of gravity and the rear wing in the front-rear direction of the fuselage, and one or more fourth rotors (12RLa, 12RRa) which are the outer rotors and are provided rearward of the rear wing. According to this feature, the control device can reduce the force generated in the rotors relative to the required moment magnitude.

In the control device for the aircraft, when changing the force generated in each of the rotors, the control device may control the pitch of each of the blades to change the force generated in each of the rotors and then control the stopped state rotation angle of each of the rotors to change the force generated in each of the rotors. According to this feature, the control device can improve the response speed when changing the force generated in each of the rotors.

In the control device for the aircraft, in a case where the energy saving mode in which reduction of the drag acting on the fuselage is prioritized is selected, the control device may control the stopped state rotation angle of each of the rotors and the pitch of each of the blades to reduce the drag generated in each of the rotors compared to a case where another mode is selected. According to this feature, the aircraft can reduce energy consumption.

Note that the present invention is not limited to the above disclosure, and various modifications are possible without departing from the essence and gist of the present invention.

The invention claimed is:

1. A control device for an aircraft,
the aircraft comprising:
    a plurality of vertical take-off and landing (VTOL) rotors each including one or more blades and configured to generate vertical thrust by rotating about a rotation shaft;
    at least one cruise rotor configured to generate forward thrust; and
    at least one fixed wing configured to generate lift when a fuselage has an airspeed,
the control device comprising one or more processors configured to execute computer-executable instructions stored in memory, the control device configured to operate the aircraft in a horizontal cruising mode and in a VTOL mode,
wherein, during operation in the horizontal cruising mode, the one or more processors execute the computer-executable instructions to simultaneously cause the control device to:
    control the rotational speed of the cruise rotor to generate forward thrust;
    perform pitch control that controls a pitch of each of the blades of the VTOL rotors;
    control each of the VTOL rotors to stop at a predetermined angle;
    maintain a stopped state rotation angle of each of the VTOL rotors; and
    generate moments around a center of gravity of the fuselage by lift and drag generated at each of the blades through the performance of the pitch control that controls the pitch of each of the blades of the VTOL rotors; and
wherein, during operation in the VTOL mode, the control device is configured to:
    control a rotational speed of each of the VTOL rotors, and
    change the pitch of the blades of each VTOL rotor.

2. The control device for the aircraft according to claim 1, wherein
    the plurality of VTOL rotors includes inner rotors and outer rotors,
    a distance from the center of gravity of the fuselage to each of the inner rotors is shorter than a distance from the center of gravity to each of the outer rotors, and
    the one or more processors cause the control device to, during operation in the horizontal cruising mode, make, through the pitch control and the stopped state rotation angle control, the moment applied to the fuselage due to lift and drag generated in each of the outer rotors larger than the moment applied to the fuselage due to lift and drag generated in each of the inner rotors.

3. The control device for the aircraft according to claim 2, wherein
    the at least one fixed wing comprises:
        a front wing provided forward of the center of gravity of the fuselage;
        a rear wing provided rearward of the center of gravity of the fuselage;
    the outer rotors include a first rotor and a fourth rotor;
    the inner rotors include a second rotor and a third rotor;
    the first rotor is provided forward of the front wing;
    the second rotor is provided between the front wing and the center of gravity in a front-rear direction of the fuselage;
    the third rotor is provided between the center of gravity and the rear wing in the front-rear direction of the fuselage; and
    the fourth rotor is provided rearward of the rear wing.

4. The control device for the aircraft according to claim 1, wherein
    in a case where lift and drag generated in each of the VTOL rotors are changed during operation in the horizontal cruising mode, the one or more processors cause the control device to change the lift and drag generated in each of the VTOL rotors through the pitch control, and then change the lift and drag generated in each of the VTOL rotors through the stopped state rotation angle control.

5. The control device for the aircraft according to claim 1, wherein
    during operation in the horizontal cruising mode, the one or more processors cause the control device to:
        select a normal mode or an energy saving mode, and
        in a case where the energy saving mode has been selected, reduce, through the pitch control and the stopped state rotation angle control, drag generated in each of the rotors compared to a case where the normal mode is selected.

6. The control device for the aircraft according to claim 1, wherein
    during operation in the horizontal cruising mode in a state where rotation of the rotors is stopped, the one or more processors cause the control device to perform the pitch control and the stopped state rotation angle control.

7. The control device for the aircraft according to claim 1, wherein
    the one or more processors cause the control device,
        during operation in the VTOL mode, to perform the pitch control that controls the pitch of each of the blades in a state where the VTOL rotors are rotated, and perform rotation control that controls rotational speed of each of the VTOL rotors, in order to provide the fuselage with vertical thrust caused by the lift generated at each of the blades; and
        during operation in the horizontal cruising mode, to perform the pitch control that controls the pitch of each of the blades in a state where the VTOL rotors are stopped, and perform the stopped state rotation angle control that controls each of the VTOL rotors to stop at a predetermined angle, in order to generate moment around the center of gravity of the fuselage by lift and drag generated at each of the blades.

* * * * *